United States Patent
Evans

[11] Patent Number: 6,113,145
[45] Date of Patent: Sep. 5, 2000

[54] SAFETY BELT PRETENSIONER

[75] Inventor: Raymond George Evans, Carlisle, United Kingdom

[73] Assignee: Breed Automotive Technology, Inc., Lakeland, Fla.

[21] Appl. No.: 09/011,442

[22] PCT Filed: Aug. 9, 1996

[86] PCT No.: PCT/GB96/01963

§ 371 Date: Mar. 30, 1998

§ 102(e) Date: Mar. 30, 1998

[87] PCT Pub. No.: WO97/06995

PCT Pub. Date: Feb. 27, 1997

[30] Foreign Application Priority Data

Aug. 11, 1995 [GB] United Kingdom .................. 9516540

[51] Int. Cl.[7] ................................................ B60R 22/46
[52] U.S. Cl. .............................. 280/806; 297/480; 60/635
[58] Field of Search ........................... 280/806; 297/480; 60/635, 638, 632

[56] References Cited

U.S. PATENT DOCUMENTS

| | | | |
|---|---|---|---|
| 4,508,287 | 4/1985 | Nilsson | 280/806 |
| 5,480,190 | 1/1996 | Fohl | 280/806 |

FOREIGN PATENT DOCUMENTS

| | | |
|---|---|---|
| 2258063 | 6/1974 | Germany . |
| 6-344863 | 12/1994 | Japan . |

*Primary Examiner*—Peter C. English
*Attorney, Agent, or Firm*—Markell Seitzman

[57] ABSTRACT

A pyrotechnic pretensioner for a vehicle safety belt comprises a piston slidably movable within a cylinder and attached to one end of a cable. The piston is driven along the cylinder by a gas generator to pull the cable and tension the safety belt. A locking device allows free movement of the piston in a tensioning direction and engages the cylinder to prevents movement of the piston in a loosening direction. The internal surface of the cylinder has a tooth profile engaged by the locking device. The piston has two resilient sealing members which cooperate with the tooth profile to seal the spaces between the teeth. The two sealing members are spaced apart by an odd integral number of half pitches of the teeth.

10 Claims, 3 Drawing Sheets

SAFETY BELT PRETENSIONER

FIELD OF THE INVENTION

The present invention relates to pretensioners for vehicle safety restraint devices and particularly to a locking and sealing means therefor.

BACKGROUND OF THE INVENTION

Pretensioners reduce the slack in a belt restraint system by rapidly drawing in a length of belt webbing in the first milliseconds of a crash situation, to secure the vehicle occupant in the correct position in the seat and reduce the residual forward momentum of the occupant traditionally resulting from slack in the belt webbing due to relatively loose winding on the retractor, to bulky clothing and/or to belt webbing stretch.

One example of a known pretensioner uses pyrotechnic means to generate gas to move a piston attached to a cable to tighten the belt by rapidly rewinding the retractor or by pulling back the buckle attachment.

There is a problem with such a pyrotechnic pretensioner in sealing the space between the moving piston and the walls of the cylinder within which it moves, against the large force of the gas generated. Known sealing systems are bulky and difficult to assemble accurately with attendant higher costs of manufacture.

The present invention provides an improved pretensioner.

SUMMARY OF THE INVENTION

According to the present invention there is provided a pyrotechnic pretensioner for a vehicle safety restrain comprising:

means for tensioning belt webbing;

a cable for actuating the tensioning means;

a piston slidably movable within a cylinder and attached to one end of the cable;

a reservoir of force for driving the piston along the cylinder to pull the cable and tension the webbing;

and a locking means which allows free movement of the piston in the cylinder in a webbing tensioning direction and operates to engage the piston with the cylinder in response to movement of the cable in a webbing loosening direction, wherein the internal surface of the cylinder has a tooth profile cooperating with the piston locking means and the piston has a circumferential radially extending resilient sealing member for cooperating with the tooth profile to seal the spaces between teeth.

Preferably the piston has two radially extending sealing members, e.g. sealing rings such as O-rings, spaced apart by an odd integral number of half pitches of the cylinder teeth.

According to a preferred embodiment the piston is die cast directly onto the cable, e.g. by a pressure die casting process.

The cylinder teeth are preferably of saw tooth profile but may be semi-circular in profile. The farce reservoir is preferably a pyrotechnic gas generator.

It will thus be seen that a pretensioner can be constructed with a sealing arrangement according to the present invention which has many advantages over known devices.

For a better understanding of the present invention and to snow row the same may be carried into effect, reference will now be made to the accompanying drawings.

DETAILED DESCRIPTION OF DRAWINGS

Figure 1:
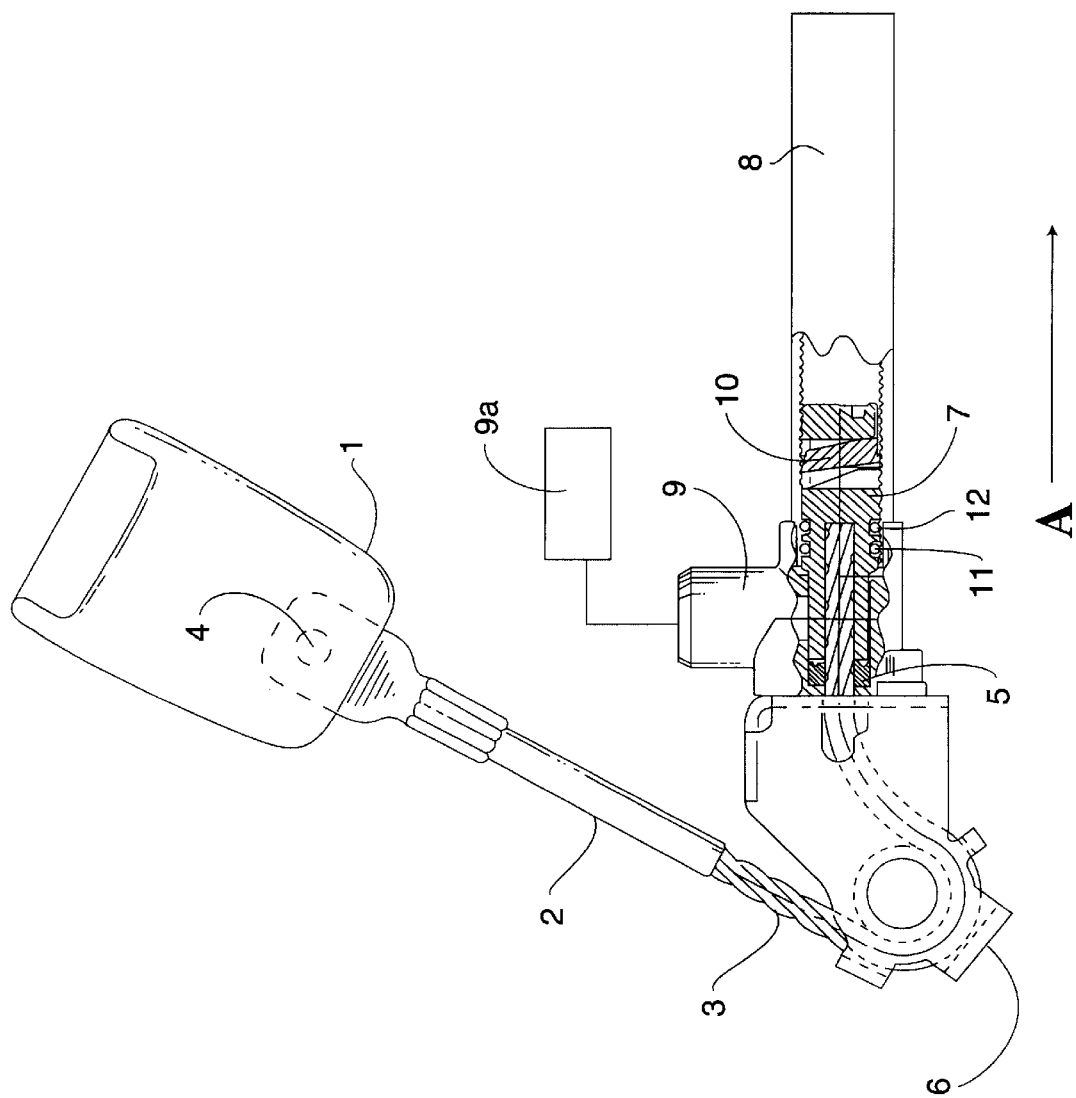
FIG. 1 is a cross-sectional view of a pyrotechnic buckle pretensioner constructed in accordance with the invention.
Figure 2:
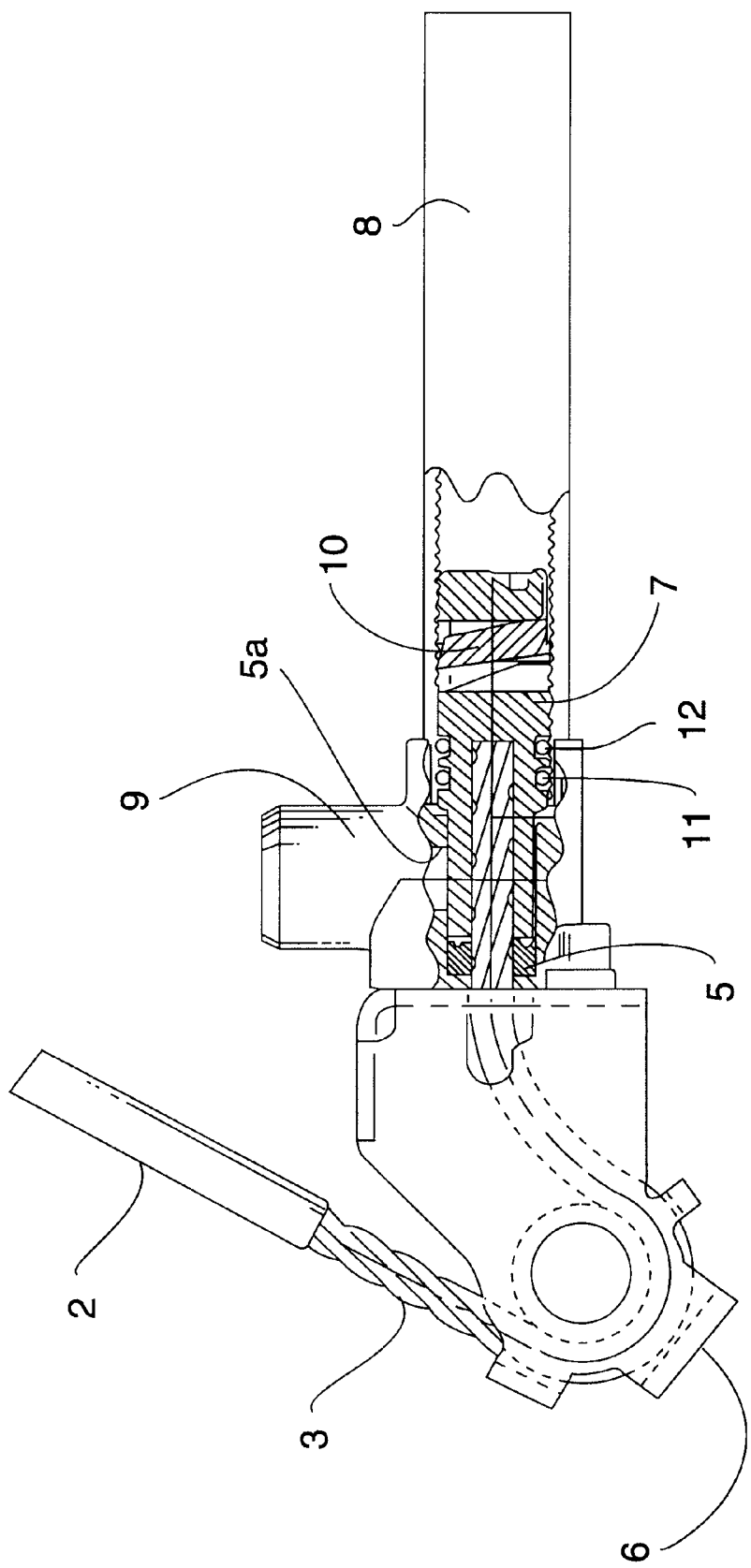
FIG. 2 is a large scale view of part of FIG. 1.

In FIG. 1 a safety restraint belt buckle 1 is shown at the end of a cable 3 with plastic coating 2. The cable 3, is rivetted at 4 to the buckle housing 1 and passes round a mounting bracket 6 and through a seal 5 into a pretensioner tube 8 where it is die cast to a pretensioner piston 7.

The mounting bracket 6 may be a pulley or a simple channel.

A gas generator housing 9 is attached to the side of the pretensioner tube 8 with which it communicates to enable gas to push the piston along the tube in the direction of arrow A. The gas generator is activated by an associated electrical pulse generating means 9a.

The inside of the tube 8 has a sawtooth form and the piston 7 is associated with an elliptical locking device 10 which moves freely in the pretensioning phase, in the direction of arrow A, since the edges of the elliptical device 10 ride over the long sides of the saw teeth. However, once the pretensioning operation is complete and the vehicle occupant momentum puts force on the buckle and thus on the piston in the opposite direction, then the edges of the elliptical device engage in the teeth in the tube and lock the piston against the reverse movement, i.e. in the direction reverse to arrow A.

The piston 7 has two axially spaced, radially extending 'O' ring seals 11 and 12. These seals are resilient, made of plastics material or rubber or other suitable gas impermeable resilient material. They are spaced apart by an odd number of ½ tooth spacings so that at any position in the tube when one seal sits in the space between the teeth, the other seal sits on or close to the crest of the tooth thus providing an effective seal for every position of the piston.

In operation, when a crash is sensed, an electrical pulse activates the gas generator which rapidly releases a volume of gas through a vertical vent in the gas generator housing into the tube between the tube seal 5 and the 'O' ring 11. The pressure of this gas forces the piston along the tube thus retracting the cable and pulling the buckle head down away from the vehicle occupant until the force in the seat belt system, i.e. the load provided by the occupant, equals the retracting force or until full retraction of the buckle head is complete.

At this stage, the load in the system acts to pull the piston back along the tube. However the elliptical locking device engages with the saw tooth ribs inside the pressure tube and thus the cable, buckle and restraint system is securely held in the pre-tensioned position.

It will be seen that because the two 'O' ring seals are separated by a distance which is ½ a pitch offset from the pitch of the saw tooth ribs, then at any instant at least one of the 'O' rings is in sealing arrangement with a saw tooth rib. Thus a strong, secure seal is provided which can withstand the high pressures generated yet it is relatively easy to install.

Figure 3:
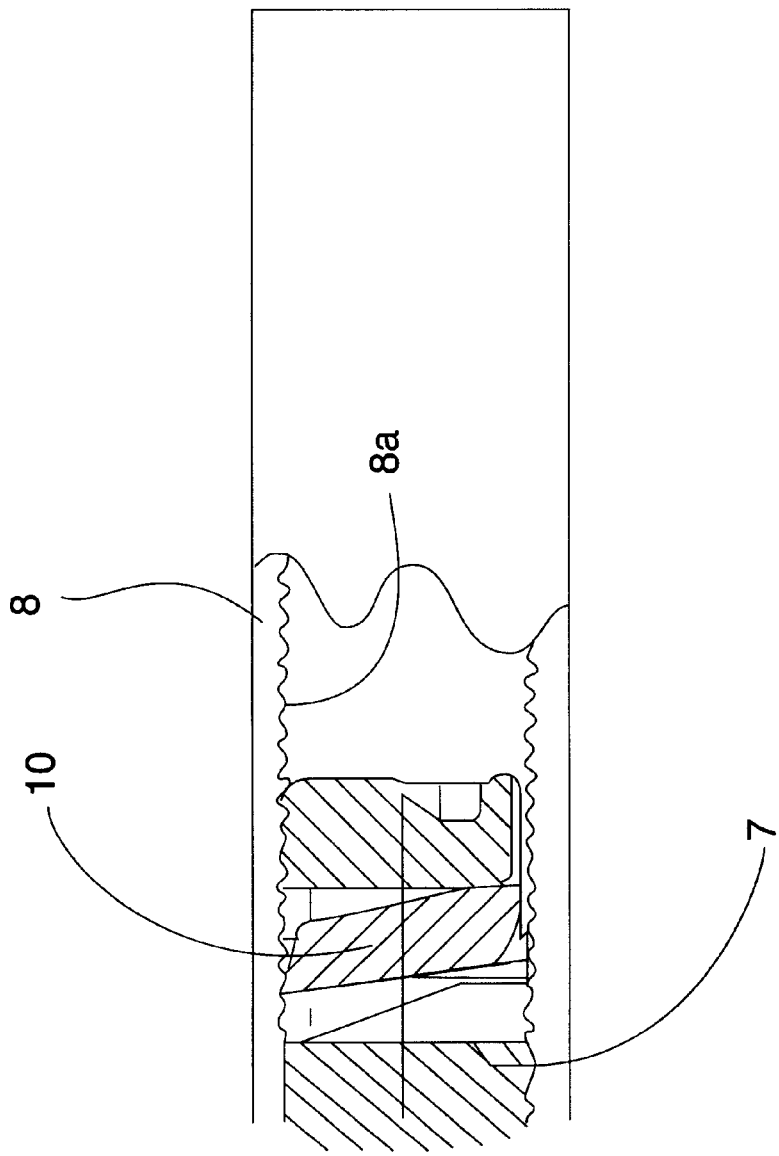
FIG. 3 is a partial view of the pretensioner showing an alternate embodiment.

The teeth profile inside the pressure tube need not be a saw tooth profile for the sealing means of this invention to work: a tooth profile of equilateral triangles or even of rounded teeth 8a (see FIG. 3) would be equally effective provided that the pitch of the 'O' rings is ½ a pitch greater than the pitch of the teeth.

What is claimed is:

1. A pyrotechnic pretensioner for a vehicle safety restraint comprising:

engaging means for engaging a belt webbing;

a cable attached to the engaging means;

a piston slidably movable within a cylinder and attached to one end of the cable;

driving means for driving the piston along the cylinder to pull the cable and tension the webbing; and locking means which allows free movement of the piston in the cylinder in a webbing tensioning direction and operates to engage the piston with the cylinder in response to movement of the cable in a webbing loosening direction, wherein the internal surface of the cylinder has a tooth profile cooperating with the locking means and the piston has two circumferential radially extending resilient sealing members for cooperating with the tooth profile to seal the spaces between teeth, wherein the two radially extending sealing members are spaced apart by an odd integral number of half pitches of the teeth.

2. A pretensioner according to claim 1 wherein at least one sealing member comprises a resilient sealing ring.

3. A pretensioner according to claim 1, wherein the piston is a die cast part.

4. A pretensioner according to claim 2 wherein the piston is a pressure die cast part.

5. A pretensioner according to claim 1 wherein at least one sealing member comprises an O-ring seal.

6. A pretensioner according to claim 1 wherein the internal cylinder teeth are of saw tooth profile.

7. A pretensioner according to claim 1 wherein the driving means is a gas generator.

8. A pretensioner according to claim 7 wherein the gas generator is activated in a crash situation by a signal input thereto.

9. A pretensioner according to claim 1 wherein the internal cylinder teeth are rounded.

10. A pretensioner according to claim 9 wherein the internal cylinder teeth are of semi-circular profile.

* * * * *